D. D. WISELL.

Improvement in Gates.

No. 129,702. Patented July 23, 1872.

Witnesses.
David H. Smith.
John H. Ormsby.

Inventor.
David D. Wisell.

UNITED STATES PATENT OFFICE.

DAVID D. WISELL, OF ZANESVILLE, INDIANA.

IMPROVEMENT IN GATES.

Specification forming part of Letters Patent No. 129,702, dated July 23, 1872.

Specification describing certain Improvements in Farm-Gates, invented by D. D. WISELL, of Zanesville, county of Allen and State of Indiana, reference being had to the accompanying drawing and letters of reference marked thereon making a part of this specification.

Figure 1:
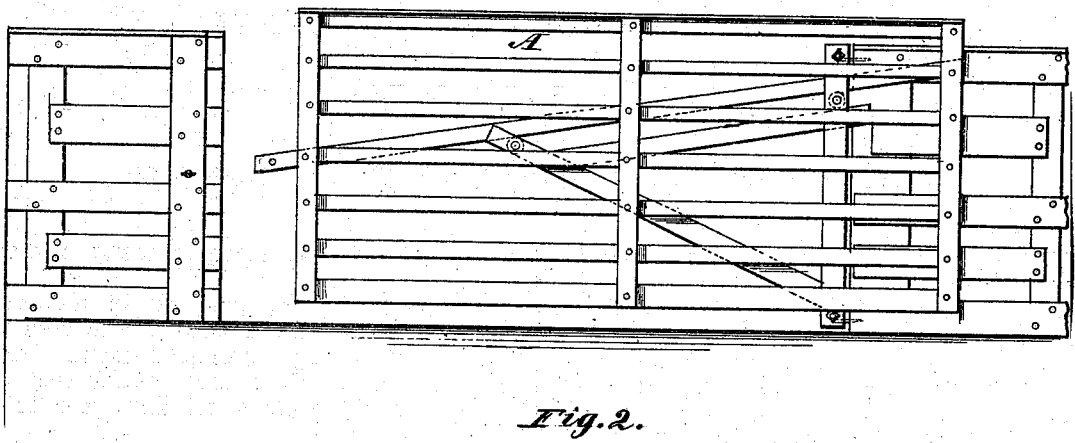
Figure 2:
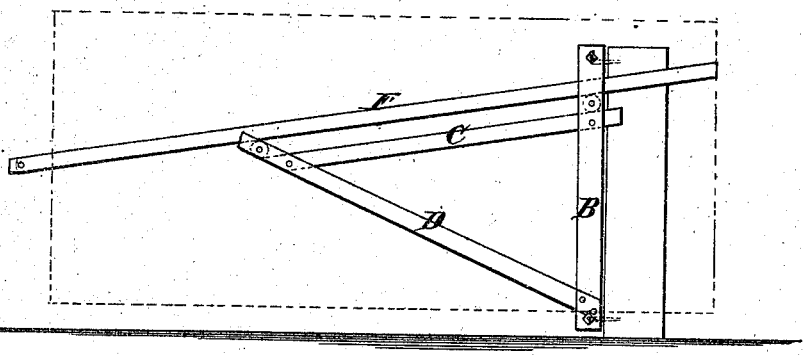

Figure 1 is a front view of my entire gate partially opened, showing its attachment to an ordinary fence. Fig. 2 is a plan view, showing the parts claimed as improvements.

To the heel-post is hinged or pivoted a rotating post, through the upper third of which is an elongated mortise. In the lower part of this mortise is secured one end of a supporting-bar; the other end, extending to the center of the gate, is fastened between the ends of a double brace extending from the lower part of the rotating post, forming with said post and bar the triangular supporting-frame to sustain the gate in its vertical position while being opened and closed. In the central part of said mortise, and between the projecting ends of the double brace, are anti-friction rollers, upon which and secured to the cross-cleats on the back part of the gate is an oblique sustaining-bar, the projecting end of which passes under a strap or its equivalent on the latch-post, making the fastening to the gate when closed.

The front end of the gate can be elevated for the passage of small stock and secured to its place by passing the projecting end of the sustaining-bar between the upper boards of the fence and putting a pin through it into the latch-post.

To open the gate slide it back on the anti-friction rollers to its center, the obliquity of the sustaining-bar elevating it sufficiently to clear all ordinary obstructions, and then rotate it, together with its supporting-frame, ninety degrees. Should the gate, while in this position, be in the way of passing with a wide load, the peculiar mode of hinging allows it to rotate to one hundred and thirty-five degrees. The gate, when in this position, is then slid forward, as in shutting, and placed entirely out of the way.

What I claim as my invention is—

In combination with a triangular supporting-frame, the oblique sustaining-bar F, secured to the gate A, in the manner and for the purposes set forth and described.

D. D. WISELL.

Witnesses:
D. H. SMITH,
J. H. ORMSBY.